(12) United States Patent
Lee et al.

(10) Patent No.: US 7,796,127 B2
(45) Date of Patent: Sep. 14, 2010

(54) ADAPTIVE RENDERING APPARATUS AND METHOD USING HIERARCHICAL STRUCTURE IN 3D IMAGE AND COMPUTER-READABLE RECORDING MEDIUM STORING COMPUTER PROGRAM FOR EXECUTING THE ADAPTIVE RENDERING METHOD

(75) Inventors: Shinjun Lee, Seoul (KR); Seokypon Jung, Seoul (KR); Alexander Parshin, Moscow (RU); Alexander Zhirkov, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 74 days.

(21) Appl. No.: 11/288,368

(22) Filed: Nov. 29, 2005

(65) Prior Publication Data

US 2006/0132484 A1 Jun. 22, 2006

(30) Foreign Application Priority Data

Dec. 16, 2004 (KR) ........................ 10-2004-0107233

(51) Int. Cl.
*G06T 15/00* (2006.01)
*G06T 17/00* (2006.01)

(52) U.S. Cl. ........................................ 345/419; 345/428

(58) Field of Classification Search ........................ None
See application file for complete search history.

(56) References Cited

U.S. PATENT DOCUMENTS 5,999,187 A 12/1999 Dehmlow et al.

2002/0130864 A1* 9/2002 Perry et al. ................. 345/421

(Continued)

OTHER PUBLICATIONS

Melero et al., "Combining SP-Octress and Impostors for the Visualisation of Multiresolution Models", Computers and Graphics, 2005, pp. 225-233 (in English).

(Continued)

*Primary Examiner*—Daniel F Hajnik
(74) *Attorney, Agent, or Firm*—Staas & Halsey LLP

(57) ABSTRACT

Provided are an adaptive rendering apparatus and method using a hierarchical structure in a 3D image and a computer-readable recording medium storing a computer program for executing the adaptive rendering method. The adaptive rendering apparatus includes a cell data provision unit, which divides an original 3D image into a plurality of lattice cells that are connected to one another in a hierarchical structure according to predetermined rendering conditions and outputs a plurality of cell data of an area of the original 3D image corresponding to the lattice cells, and a rendered image generation unit, which generates a 3D rendered image by arranging the cell data output from the cell data provision unit according to the hierarchical structure. A lattice cell belonging to a particular level in the hierarchical structure is capable of being divided into a plurality of lattice cells belonging to a level directly below the particular level, and each of the lattice cells in the level directly below the particular level is smaller than the lattice cell of the particular level. A lattice cell belonging to a particular level in the hierarchical structure is capable of being divided into 8 smaller lattice cells belonging to a level directly below the particular level. Accordingly, it is possible to adjust the quality of a rendered image and the speed of generating the rendered image and to precisely render both a 3D object image and a 3D scenic image.

30 Claims, 11 Drawing Sheets

U.S. PATENT DOCUMENTS

2003/0052878 A1* 3/2003 Han et al. .................. 345/420
2003/0214502 A1* 11/2003 Park et al. .................. 345/420
2003/0218606 A1* 11/2003 Zhirkov et al. ............. 345/419

OTHER PUBLICATIONS

Cano et al., "Progressive Transmission of Polyhedral Solids Using a Hierarchical Representation Scheme", XP-002403140, 2003, 6 pgs (in English).

Kähler et al., "Interactive Volume Rendering of Large Sparse Data Sets Using Adaptive Mesh Refinement Hierarchies", XP-002403141, IEEE Transactions on Visualization and Computer Graphic, vol. 9, No. 3, Jul.-Sep. 2003, pp. 341-351 (in English).

Levkovich-Maslyuk et al., "Depth Image-Based Representation and Compression for Static Animated 3-D Objects", XP-001198603, IEEE Transactions on Circuits and Systems for Video Technology, vol. 14, No. 7, Jul. 2004, pp. 1032-1045 (in English).

European Search Report for corresponding European Patent Application No. 05257656.8 dated Jan. 19, 2009, 8 pgs (in English).

* cited by examiner

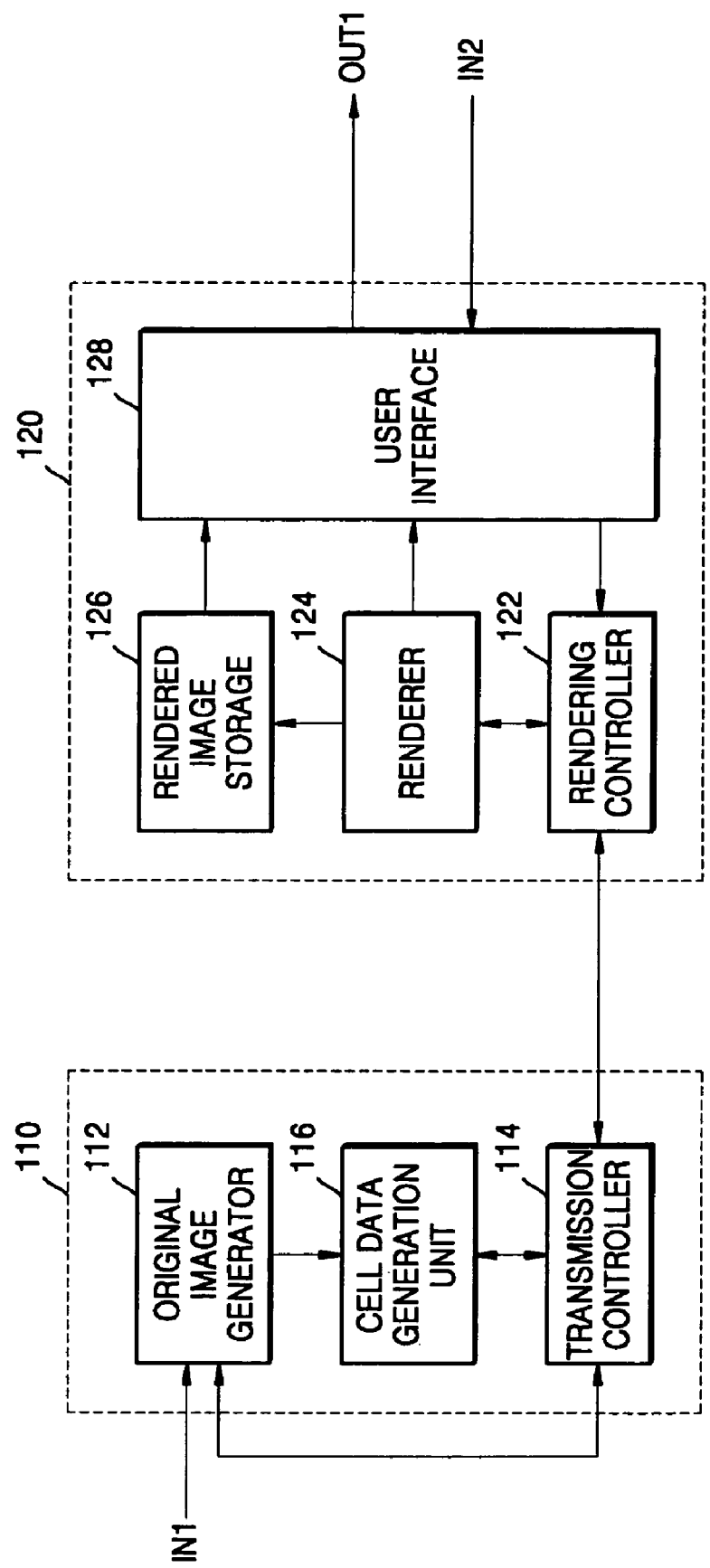

ADAPTIVE RENDERING APPARATUS AND
METHOD USING HIERARCHICAL
STRUCTURE IN 3D IMAGE AND
COMPUTER-READABLE RECORDING
MEDIUM STORING COMPUTER PROGRAM
FOR EXECUTING THE ADAPTIVE
RENDERING METHOD

CROSS-REFERENCE TO RELATED
APPLICATIONS

This application claims the benefit of Korean Patent Application No. 10-2004-0107233, filed on Dec. 16, 2004, in the Korean Intellectual Property Office, the disclosure of which is incorporated herein in its entirety by reference.

BACKGROUND OF THE INVENTION

1. Field of the Invention

The present invention relates to rendering of a three-dimensional (3D) image, and more particularly, to an adaptive rendering apparatus and method using a hierarchical structure in a 3D image, which adaptively renders the 3D image by dividing it into a plurality of lattice cells in a hierarchy and arranging cell data corresponding to the lattice cells according to the hierarchy, and a computer-readable recording medium storing a computer program for executing the adaptive rendering method.

2. Description of the Related Art

Realizing very realistic 3D images has always been one of the most important goals in the field of 3D graphics. Nowadays, very realistic 3D images can be realized based on recent developments in modeling and rendering technologies.

Conventional rendering methods include a rendering method using a polygonal model, a streaming QSplat rendering method, a rendering method using a 3D mesh, and a rendering method using a binary space partitioning (BSP) tree.

In the rendering method using a polygonal model, the amount of data required for rendering a realistic, complicated image is very large, and thus, the rendering speed is very low.

The streaming QSplat rendering method and the rendering method using a 3D mesh cannot compose a 3D scenic image but can render a 3D object image.

On the contrary, the rendering method using a BSP tree cannot render a 3D object image but can compose a 3D scenic image.

SUMMARY OF THE INVENTION

The present invention provides an adaptive rendering apparatus and method using a hierarchical structure in a 3D image including a 3D object image and a 3D scene image, which adaptively renders the 3D image by dividing it into a plurality of lattice cells that are connected to one another in a hierarchy and arranging cell data corresponding to the lattice cells according to the hierarchy, and a computer-readable recording medium storing a program for executing the adaptive rendering method.

According to an aspect of the present invention, there is provided an adaptive rendering apparatus using a hierarchical structure in a 3D image. The adaptive rendering apparatus includes a cell data provision unit, which divides an original 3D image into a plurality of lattice cells that are connected to one another in a hierarchical structure according to predetermined rendering conditions and outputs a plurality of cell data of an area of the original 3D image corresponding to the lattice cells, and a rendered image generation unit, which generates a 3D rendered image by arranging the cell data output from the cell data provision unit according to the hierarchical structure. A lattice cell belonging to a particular level in the hierarchical structure is capable of being divided into 8 smaller lattice cells belonging to a level directly below the particular level, and each of the lattice cells in the lower level is smaller than the lattice cell of the level above from which lattice is divided.

If the rendered image generation unit cannot generate the 3D rendered image by arranging the cell data output from the cell data provision unit according to the hierarchical structure, the cell data provision unit may divide the original 3D image into a plurality of lattice cells that are connected to one another in another hierarchical structure according to updated rendering conditions and may output a plurality of cell data of an area of the original 3D image corresponding to the lattice cells.

The cell data provision unit may include: a transmission controller, which generates a cell division control signal according to rendering conditions provided by the rendered image generation unit, and a cell data generator, which divides the original 3D image into a plurality of lattice cells that are connected to one another in a hierarchy in response to the cell division control signal and generates a plurality of cell data that are image data of the original 3D image corresponding to the lattice cells. The transmission controller outputs the cell data generated by the cell data generator to the rendered image generation unit.

The rendered image generation unit may include: a rendering controller, which receives the cell data output from the cell data provision unit and generates a cell arrangement control signal, and a renderer, which generates a 3D rendered image by arranging the cell data received by the rendering controller in response to the cell arrangement control signal. The 3D rendered image is generated by arranging the cell data received by the rendering controller according to the hierarchical structure in response to the cell arrangement control signal.

According to another aspect of the present invention, there is provided a cell data generation apparatus using a hierarchical structure in a 3D image. The cell data generation apparatus includes a transmission controller, which generates a cell division control signal according to given rendering conditions, and a cell data generator, which divides an original 3D image into a plurality of lattice cells that are connected to one another in a hierarchy in response to the cell division control signal and generates a plurality of cell data of an area of the original 3D image corresponding to the lattice cells. The cell data of each of the lattice cells has voxel values.

According to another aspect of the present invention, there is provided a rendering apparatus using a hierarchical structure in a 3D image. The rendering apparatus includes a rendering controller, which generates a cell arrangement control signal, and a renderer, which generates a 3D rendered image by arranging a plurality of cell data corresponding to a plurality of lattice cells that are connected to one another in a hierarchical structure in response to the cell arrangement control signal. The 3D rendered image is generated by arranging the cell data according to the hierarchical structure in response to the cell arrangement control signal, and the cell data of each of the lattice cells has voxel values.

According to another aspect of the present invention, there is provided an adaptive rendering method using a hierarchical structure in a 3D image. The adaptive rendering method includes dividing an original 3D image into a plurality of lattice cells that are connected to one another in a hierarchical structure according to predetermined rendering conditions and outputting a plurality of cell data of an area of the original 3D image corresponding to the lattice cells, and arranging the output cell data according to the hierarchical structure. A lattice cell belonging to a particular level in the hierarchical structure is capable of being divided into 8 smaller lattice cells belonging to a level directly below the particular level, and each of the cell data has voxel values.

According to another aspect of the present invention, there is provided a cell data generation method using a hierarchical structure in a 3D image. The cell data generation method includes generating a cell division control signal according to given rendering conditions, and dividing an original 3D image into a plurality of lattice cells that are connected to one another in a hierarchy in response to the cell division control signal and generating a plurality of cell data of an area of the original 3D image corresponding to the lattice cells. The cell data of each of the lattice cells has voxel values.

According to another aspect of the present invention, there is provided a rendering method using a hierarchical structure in a 3D image. The rendering method includes generating a cell arrangement control signal, and generating a 3D rendered image by arranging a plurality of cell data corresponding to a plurality of lattice cells that are connected to one another in a hierarchical structure in response to the cell arrangement control signal. The cell data of each of the lattice cells has voxel values, and the 3D rendered image is generated by arranging the cell data according to the hierarchical structure in response to the cell arrangement control signal.

According to another aspect of the present invention, there is provided a computer-readable recording medium for storing a computer program for executing an adaptive rendering method using a hierarchical structure in a 3D image, the adaptive rendering method including dividing an original 3D image into a plurality of lattice cells that are connected to one another in a hierarchical structure according to predetermined rendering conditions and outputting a plurality of cell data of an area of the original 3D image corresponding to the lattice cells, and arranging the output cell data according to the hierarchical structure. A lattice cell belonging to a particular level in the hierarchical structure is capable of being divided into 8 smaller lattice cells belonging to a level directly below the particular level, and the cell data of each of the lattice cells has voxel values.

According to another aspect of the present invention, there is provided a computer-readable recording medium for storing a computer program for executing a cell data generation method using a hierarchical structure in a 3D image, the cell data generation method including generating a cell division control signal according to given rendering conditions, and dividing an original 3D image into a plurality of lattice cells that are connected to one another in a hierarchy in response to the cell division control signal and generating a plurality of cell data of an area of the original 3D image corresponding to the lattice cells. The cell data of each of the lattice cells has voxel values.

According to another aspect of the present invention, there is provided a computer-readable recording medium for storing a computer program for executing a rendering method using a hierarchical structure in a 3D image, the rendering method including: generating a cell arrangement control signal, and generating a 3D rendered image by arranging a plurality of cell data corresponding to a plurality of lattice cells that are connected to one another in a hierarchical structure in response to the cell arrangement control signal. The cell data of each of the lattice cells has voxel values, and the 3D rendered image is generated by arranging the cell data according to the hierarchical structure in response to the cell arrangement control signal.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a block diagram of an adaptive rendering apparatus using a hierarchical structure in a 3D image, according to an exemplary embodiment of the present invention;

DETAILED DESCRIPTION OF THE PREFERRED EMBODIMENTS

Figure 2A:
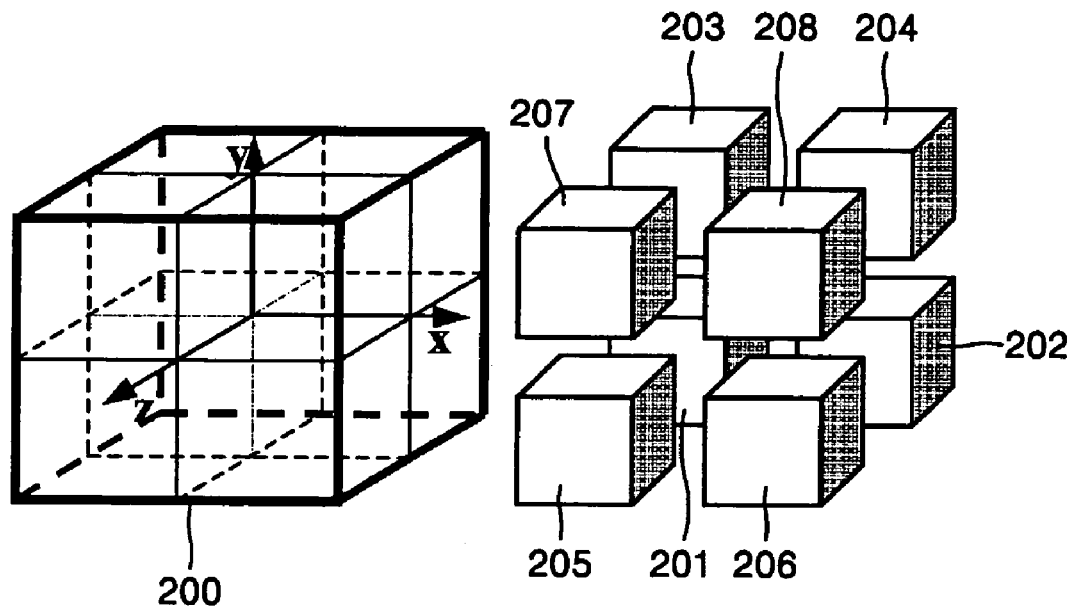
FIGS. 2A and 2B are diagrams illustrating an original 3D image divided into a plurality of lattice cells.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an adaptive rendering apparatus using a hierarchical structure in a 3D image. In FIG. 1, the adaptive rendering apparatus includes a cell data provision unit 110 and a rendered image generation unit 120.

The cell data provision unit 110 divides a given 3D image into a plurality of lattice cells, which are connected to one another in a predetermined hierarchy according to predetermined conditions, and outputs a plurality of cell data corresponding to the lattice cells. The lattice cells constitute a lattice-shaped 3D space, and the cell data is image data of the lattice cells. The image data preferably, but not necessarily, is voxel data. Herein, the voxel means a minimum unit of 3-dimensional data. Similarly, pixel means a minimum unit of 2-dimensional data.

The rendered image generation unit 120 generates a 3D rendered image by arranging the cell data output from the cell data provision unit 110 according to the hierarchical structure among the lattice cells.

The cell data provision unit 110 and the rendered image generation unit 120 may be integrated into one device. Alternatively, the cell data provision unit 110 and the rendered image generation unit 120 may be separated from each other, in which case, the cell data provision unit 110 and the rendered image generation unit 120 can be connected to a network as a host server and a client server, respectively.

The structures of the cell data provision unit 110 and the rendered image generation unit 120 will now be described in detail.

The cell data provision unit 110 includes an original image generator 112, a transmission controller 114, and a cell data generator 116. The rendered image generation unit 120 includes a rendering controller 122, a renderer 124, a rendered image storage 126, and a user interface 128.

The original image generator 112 photographs a 3D image and generates an original 3D image using the photographed 3D image. In FIG. 1, IN1 is the photographed 3D image.

The original image generator 112 may generate the original 3D image by photographing an external 3D image or by using a 3D image previously stored. In a case where the original 3D image is generated using a 3D image previously stored, the cell data provision unit 110 may not include the original image generator 112.

The transmission controller 114 controls the original image generator 112 to photograph an external 3D image. The transmission controller 114 receives the photographed external 3D image from the original image generator 112 as an original 3D image.

The transmission controller 114 receives predetermined rendering conditions from the rendering controller 122 in the rendered image generation unit 120. Examples of the rendering conditions include a rendering time condition regarding the time required for the rendered image generation unit 120 to render an image, a rendering quality condition regarding the quality of the rendered image, and a rendering viewpoint condition regarding the viewpoint of the rendered image. The rendering conditions are determined based on the hardware characteristics of the rendered image generation unit 120. In general, the more it takes to render an image, the higher the quality of the rendered image. Accordingly, there is a trade-off between the rendering time condition and the rendering quality condition.

The transmission controller 114 generates a cell division control signal according to the rendering conditions provided by the rendered image generation unit 120. The cell division control signal is a signal used for controlling how and based on what hierarchical structure the original 3D image should be divided. Specifically, a hierarchy among a plurality of lattice cells of the original 3D image or a hierarchy among cell data of the lattice cells are determined based on the rendering conditions. For example, suppose that only the rendering quality condition helps to more precisely render a predetermined portion of the original 3D image. In order to more precisely render the predetermined portion of the original 3D image than other portions of the original 3D image, each of a plurality of lattice cells constituting the predetermined portion of the original 3D image should be further divided into smaller lower-level lattice cells so that the predetermined portion of the original 3D image can be rendered with even more lattice cells than when it is rendered with higher-level lattice cells. Since more cell data is necessary for more precisely rendering the predetermined portion of the original 3D image, and one lattice cell has only one cell data, each of the lattice cells constituting the predetermined portion of the original 3D image should be further divided into smaller lower-level lattice cells. In other words, the predetermined portion of the original 3D image is preferably, but not necessarily, rendered with lower-level lattice cells than other portions of the original 3D image.

However, if the predetermined portion of the original 3D image is rendered with lower-level lattice cells than other portions of the original 3D image, the amount of cell data needed to be processed when rendering the predetermined portion of the original 3D image is larger than the amount of cell data needed to be processed when rendering other portions of the original 3D image. The more cell data the rendered image generation unit 120 needs to process, the lower the rendering speed of the rendered image generation unit 120 becomes. Thus, there is also a trade-off between the rendering speed of the rendered image generation unit 120 and the quality of an image rendered by the rendered image generation unit 120.

In short, the predetermined portion of the original 3D image that needs to be more precisely rendered may be rendered with lower-level lattice cells than neighboring portions of the original 3D image. In particular, a portion of the original 3D image representing a 3D object may be rendered with lower-level lattice cells than neighboring portions of the original 3D image.

In addition, a portion of the original 3D image representing an object that is less far away from a predetermined viewpoint may be rendered with lower-level lattice cells than a portion of the original 3D image representing an object that is further away from the predetermined viewpoint.

The transmission controller 114 provides the cell division control signal to the cell data generator 116. The transmission controller 114 preferably, but not necessarily, provides the cell division control signal to the cell data generator 116 along with the original 3D image. The original 3D image provided to the cell data generator 116 by the transmission controller 114 is preferably, but not necessarily, the external 3D image photographed by the original image generator 112.

The cell data generator 116 divides the original 3D image into a plurality of lattice cells, which are connected to one another in a hierarchical structure, in response to the cell division control signal and generates a plurality of cell data. The cell data generator 116 may receive the original 3D image generated by the original image generator 112 from the original image generator 112 or from the transmission controller 114. Alternatively, the cell data generator 116 may use a previously given 3D image instead of the original 3D image generated by the original image generator 112.

The transmission controller 114 transmits the cell data generated by the cell data generator 116 to the rendering controller 122 of the rendered image generation unit 120.

The rendering controller 122 receives the cell data from the transmission controller 114 and generates a cell arrangement control signal. The cell arrangement control signal is a signal used for controlling how the renderer 124 should arrange the cell data received from the transmission controller 114. The cell arrangement control signal is preferably, but not necessarily, generated according to the rendering conditions. Since the cell division control signal and a hierarchical structure of the lattice cells of the original 3D image are dependent upon the rendering conditions, the cell arrangement control signal may be dependent upon the cell division control signal generated by the transmission controller 114 or the hierarchical structure transmitted from the transmission controller 114.

The rendering controller 122 provides the cell arrangement control signal to the renderer 124. The rendering controller 122 preferably, but not necessarily, provides the cell arrangement control signal to the renderer 124 along with the cell data.

The renderer 124 generates a rendered image by arranging the cell data in response to the cell arrangement control signal generated by the rendering controller 122. The rendered image is an image obtained using an adaptive rendering method according to an exemplary embodiment of the present invention. In other words, the rendered image is obtained by arranging the cell data according to the hierarchy in response to the cell arrangement control signal provided by the rendering controller 122.

The rendered image storage 126 stores the rendered image generated by the renderer 124. The adaptive rendering apparatus, however, may not include the rendered image storage 126.

The user interface 128 displays the rendered image stored in the rendered image storage 126 or generated by the renderer 124 to the outside of the adaptive rendering apparatus. In FIG. 1, OUT1 is the displayed rendered image.

The user interface 128 receives rendering conditions from the outside of the adaptive rendering apparatus. In FIG. 1, IN2 is data regarding the rendering conditions received from the outside of the adaptive rendering apparatus. The rendering conditions IN2 received from the outside of the adaptive rendering apparatus are transmitted to the rendering controller 122 and then to the transmission controller 114.

The rendered image generation unit 120 may be installed in a portable device, such as a personal digital assistant (PDA) or a cellular phone.

Figure 2B:
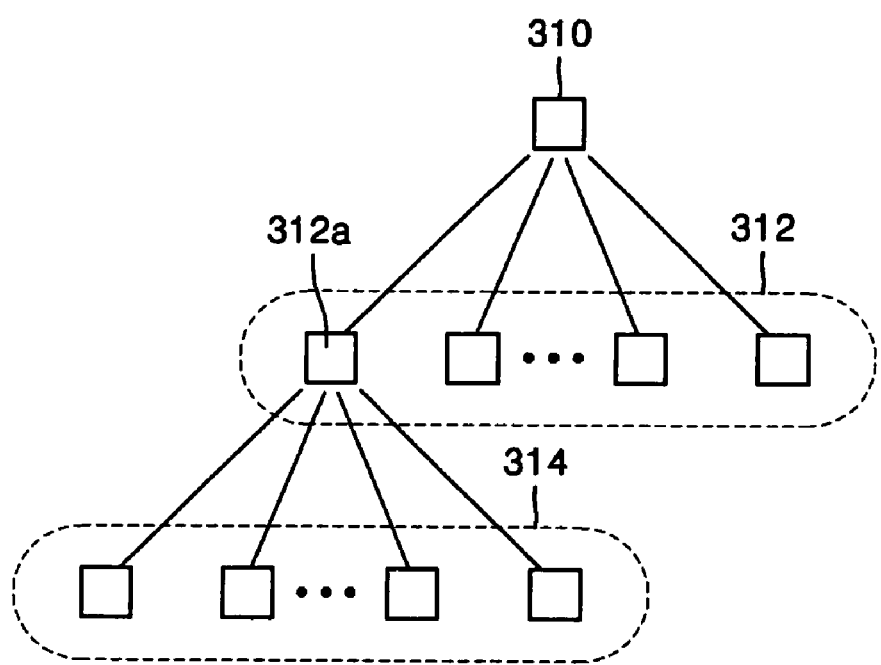

FIGS. 2A and 2B are diagrams illustrating, respectively, a plurality of lattice cells of an original 3D image, and a hierarchy among the lattice cells. In FIG. 2A, an original 3D image 200 can be divided into a plurality of lattice cells 201 through 208, and each of the lattice cells 201 through 208 can be divided into a plurality of smaller lattice cells (not shown). Preferably, but not necessarily, the lattice cells 201 through 208 are not duplicative.

A hierarchical structure is a structure having a plurality of levels. A hierarchical structure may be represented as a tree. Elements of a hierarchical structure are called nodes. In FIG. 2B, reference numerals 310 through 314 correspond to nodes.

In FIG. 2B, in a tree, a node, which matches with a plurality of lower nodes called child nodes, is called a parent node. The node 310 is a parent node of a plurality of nodes 312, and the node 312*a* is a parent node of a plurality of nodes 314.

In FIG. 2B, the node 310 corresponds to the original 3D image 200 of FIG. 2A, the nodes 312 correspond to the lattice cells (201 through 208) of FIG. 2A. Accordingly, the node 312 is comprised of a total of 8 child nodes.

In FIG. 2B, the nodes 314 correspond to a plurality of lower-level lattice cells into which each of the lattice cells 201 through 208 of FIG. 2A can be divided.

In other words, in the tree of FIG. 2B, the nodes 312 correspond to the respective lattice cells (201 through 208) of the original 3D image 200 of FIG. 2A, and the node 310 corresponds to the original 3D image 200 of FIG. 2A.

Accordingly, one lattice cell can be divided into lower-level lattice cells, and each of the lower-level lattice cells can be divided into even lower-level lattice cells. The lower the level of lattice cells, the smaller the size of the lattice cells. If an arbitrary lattice cell is divided into a total of 8 lower-level lattice cells, the arbitrary lattice cell has an octree structure. The number of lattice cells into which the arbitrary lattice cell can be divided is not restricted to 8. In other words, the arbitrary lattice cell can be divided into more than 8 lower-level cells.

The original 3D image 200 includes a 3D scenic image and a 3D object image. The 3D object image is a portion of the original 3D image 200 representing, for example, a person or an object, and the 3D scenic image is a portion of the original 3D image 200 representing a place where the person or the object represented by the 3D object image is located. Conventional rendering methods cannot precisely render a 3D object image and a 3D scenic image at the same time. In other words, in a 3D scenic image rendered using a conventional rendering method, a 3D object image is not precisely rendered, and only information on the location of the 3D object image in the original 3D image is provided. However, both a 3D object image and a 3D scenic image can be precisely represented in an image rendered using the adaptive rendering apparatus of FIG. 1.

Figure 3A:
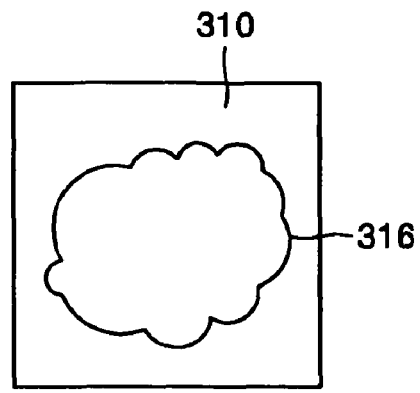
FIGS. 3A through 3C are diagrams illustrating a hierarchical structure of an original 3D image.
Figure 3B:
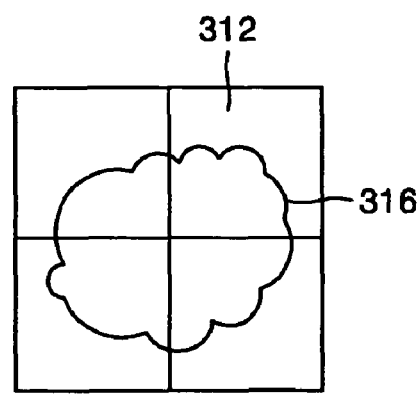
Figure 3C:
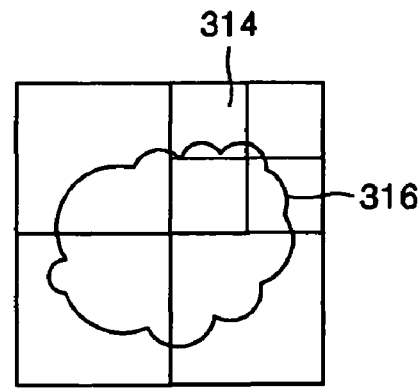

FIGS. 3A through 3C are diagrams illustrating a cross section of an original 3D image 200. In FIG. 3A, the cross-section of the original 3D image 200 includes a 3D object image 316 and a 3D scenic image 310. In FIG. 3B, the cross-section of the original 3D image 200 is divided into four lattice cells 312. The four lattice cells correspond to four of the 8 nodes 312 of FIG. 2A, e.g., the lattice cells 201 through 204. If the original 3D image 200 has an octree structure, its cross section is comprised of 4 lattice cells, as shown in FIG. 3B.

In FIG. 3C, one of the 4 lattice cells 312 constituting the cross section of the original 3D image is divided into 4 smaller lattice cells 314. The 4 smaller lattice cells 314 correspond to the nodes 314 of FIG. 2B.

Figure 4:
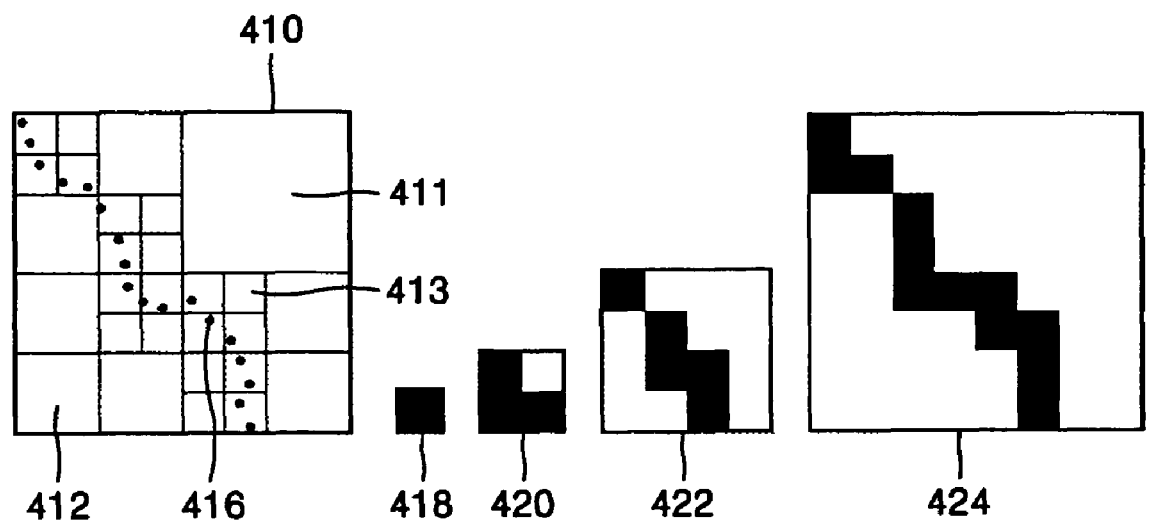
FIG. 4 is a diagram illustrating a cross section of an original 3D image comprised of a plurality of lattice cells with different sizes.

FIG. 4 is a diagram illustrating a cross section of an original 3D image 200. In FIG. 4, the original 3D image 200 includes a 3D object image 416 and is comprised of a plurality of lattice cells that are connected to one another in a hierarchy. The hierarchical structure of the original 3D image 200 is comprised of 4 levels, i.e., first through fourth levels. For the convenience of description, suppose that the first level is the uppermost level and the fourth level is the lowermost level.

In FIG. 4, reference numerals 410, 411, 412, and 413 represent a lattice cell (hereinafter referred to as a first-level lattice cell) in the first level, a lattice cell (hereinafter referred to as a second-level lattice cell) in the second level, a lattice cell (hereinafter referred to as a third-level lattice cell) in the third level, and a lattice cell (hereinafter referred to as a fourth-level lattice cell) in the fourth level, respectively. Likewise, a lattice cell in an n-th level is referred to as an n-th level lattice cell. Suppose that a lattice cell containing part of the 3D object image 416 belongs to a lower level in the hierarchical structure of the original 3D image than a lattice cell not containing any part of the 3D object image 416.

As described above, cell data of a lattice cell may be image data having a set of voxel values, i.e., a red voxel value, a green voxel value, and a black voxel value. Each of the red, green, and black voxel values may be set to a value from 0 to 255. For example, cell data of a predetermined lattice cell may be set to [0 1 0], in which case, the predetermined lattice cell has no red or black voxel value but only has a green voxel value of 1. Likewise, the cell data of the predetermined lattice cell may be set to [0 20 255], in which the predetermined lattice cell is represented as dark green because the predetermined lattice cell has no red voxel value but has a green voxel value of 20 and a black voxel value of 255.

This type of method of representing the original 3D image 200 by setting cell data of each of the lattice cells 411, 412, 413, and 416 to a set of voxel values will now be referred to as a color binary volumetric octree (CBVO) method. According to the CBVO method, it is determined whether to represent each of the lattice cells 411, 412, 413, and 416 as a transparent space or a colored space depending on the set of voxel values to which a corresponding lattice cell is set. A CBVO format is a binary format and is different from an ASCII code or a text code. In other words, information represented in a CBVO format cannot be perceived by a user when programmed in a hexadecimal code. For example, in order to represent a lattice cell as darkest pure green, cell data of the lattice cell may be set to [0 255 0] and then coded as [0 FF 0] according to the CBVO method.

A CBVO format includes a header, a binary volumetric octree (BVO) field and a color field. The header stores resolution information of cell data. The lower the level of lattice cells constituting the original 3D image 200, the higher the resolution of the original 3D image 200. The BVO field stores the number of lattice cells constituting the original 3D image 200. The higher the value of the BVO field, the greater the number of lattice cells constituting the original 3D image 200. The greater the number of lattice cells constituting the original 3D image 200, the more information contained in a rendered image obtained based on the original 3D image 200. The color field stores voxel value information of the cell data. The cell data may be represented as a transparent space or a colored space depending on the value of the color field. In other words, as described above, the cell data is image data having a set of voxel values. The set of voxel values may include a red voxel value, a green voxel value, a black voxel value, and a transparency value. In other words, the cell data may be set to a red voxel value, to a green voxel value, to a black voxel value, and then to a transparency value.

Reference numeral 418 represents a cross section of the original 3D image 200 yet to be divided into a plurality of lattice cells. The first-level lattice cell 410 corresponds to the original 3D image 200. Suppose that the first-level lattice cell 410, which includes the 3D object image 416, contains cell data satisfying Equation (1):

$$[R\ G\ B\ A]=[0\ 0\ FF\ FF] \quad (1)$$

where R, G, B, and A represent a red voxel value, a green voxel value, a black voxel value, and a transparency value, respectively, and FF represents a voxel value of 255. Accordingly, the cross section 418 is represented as black.

Likewise, reference numeral 420 represents a cross section of the original 3D image 200 after the first-level lattice cell 410 is divided into a total of 8 second-level lattice cells 411. Suppose that cell data of some of the second-level lattice cells 411 containing part of the 3D object image 416 satisfies Equation (2):

$$[R\ G\ B\ A]=[0\ 0\ FF\ FF] \quad (2)$$

Then, as shown in FIG. 4, 75% of the cross section 420 is represented as black.

Cross sections 422 and 424 of the original 3D image 200 are represented in the same manner as described above. In short, the further the original 3D image 200 is divided, the more lattice cells the 3D object image 416 is rendered with. The more lattice cells the 3D object image 416 is rendered with, the larger the amount of cell data transmitted from the cell data provision unit 110 to the rendered image generation unit 120. Accordingly, the rendered image generation unit 120 can generate a high-quality rendered image using such large amount of cell data provided by the cell data provision unit 110. However, in order to generate a high-quality rendered image, the rendered image generation unit 120 should be designed to be able to support a rendering quality condition suitable for achieving such high picture quality.

FIGS. 5A through 5D are diagrams illustrating the adaptive rendering of a cross section of an original 3D image 300 in accordance with the movement of an observer. Referring to FIGS. 5A through 5D, reference numerals 510 and 511 represent 3D object images, and reference numeral 500 represents an observer. The observer is preferably, but not necessarily, the original image generator 112 of FIG. 1. Reference numerals 501a and 501b represent boundaries of the field of vision of the observer that observes both of the 3D object images 510 and 511. The field of vision of the observer corresponds to an acute angle between the boundaries 501a and 501b. Reference numeral 520, 530, and 531 represent a first-level lattice cell, a second-level lattice cell containing part of the 3D object image 510 or 511, a second-level lattice cell not containing any part of the 3D object image 510 or 511.

Reference numeral 540 represents a third-level lattice cell not containing any part of the 3D object image 510 or 511. Reference numeral 541 represents a third-level lattice cell containing any part of the 3D object image 510 or 511. Reference numeral 550 represents a fourth-level lattice cell not containing any part of the 3D object image 510 or 511. Reference numeral 551 represents a fourth-level lattice cell containing any part of the 3D object image 510 or 511.

Reference numerals 560 and 561 represent a fifth-level lattice cell not containing any part of the 3D object image 510 or 511, and a fifth-level lattice cell containing part of the 3D object image 510 or 511, respectively.

As described above with reference to FIG. 4, suppose that a lattice cell in an n-th level is referred to as an n-th level lattice cell. Suppose that a lattice cell containing part of the 3D object image 510 or 511 belongs to a lower level in the hierarchical structure of the original 3D image than a lattice cell not containing any part of the 3D object image 510 or 511.

Figure 5A:
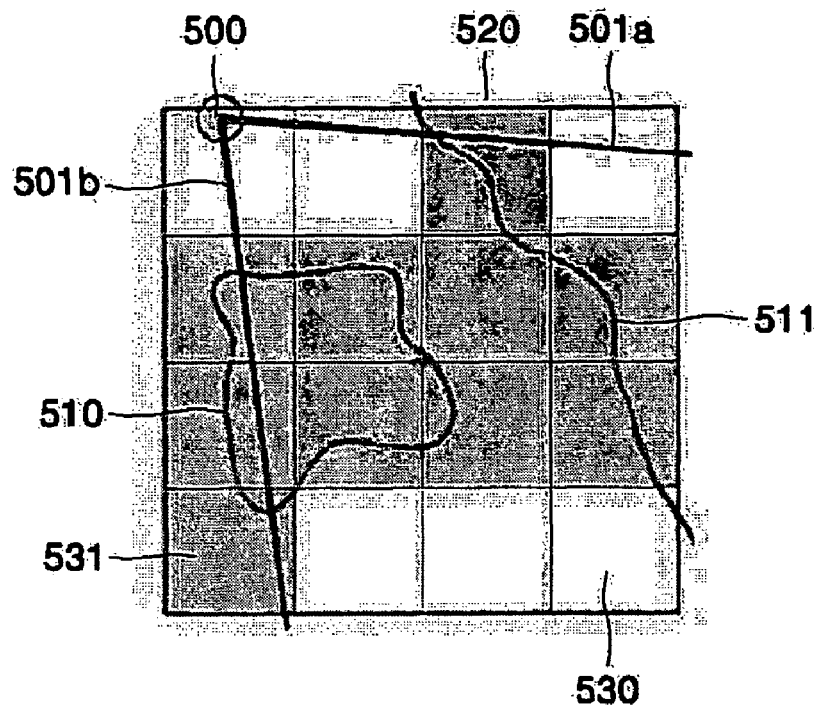
FIGS. 5A through 5D are diagrams illustrating the adaptive rendering of a 3D image in accordance with the movement of an observer.
Figure 5B:
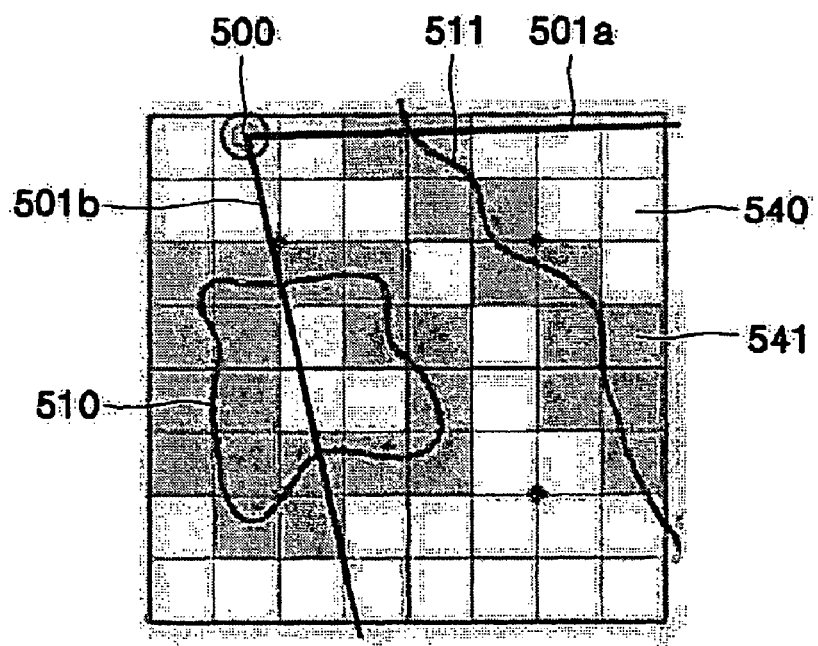
Figure 5C:
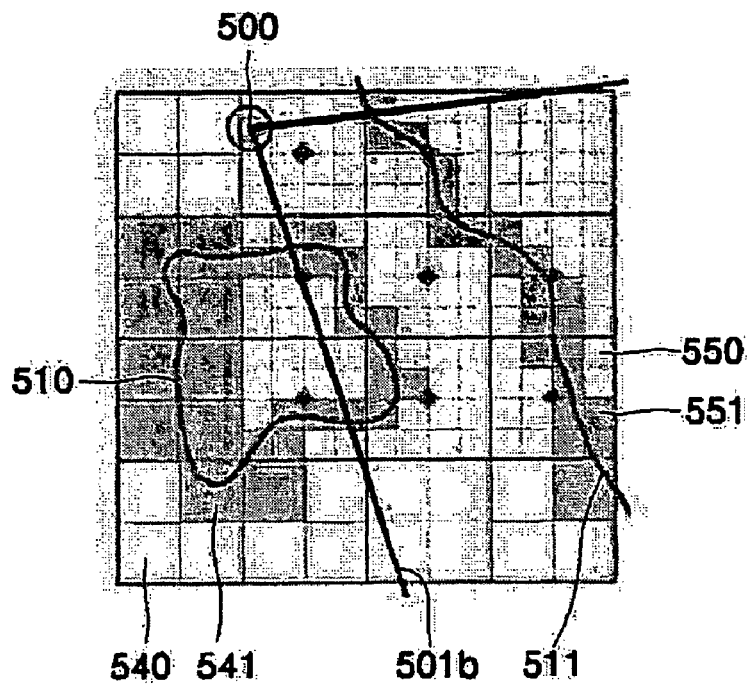
Figure 5D:
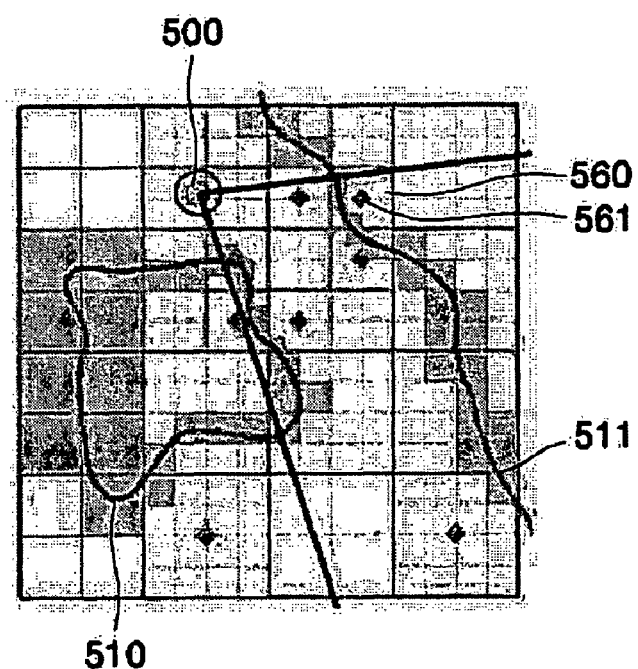

Referring to FIGS. 5A through 5D, the observer 500 gradually moves from a place where it is located in FIG. 5A to a place where it is located in FIG. 5D. Reference numerals 531, 541, 551, and 561 represent portions of the 3D object images 510 and 511 observed by the observer 500. The size of lattice cells into which the original 3D image 200 including the 3D object images 510 and 511 is divided is smaller in FIG. 5D than in FIG. 5C, smaller in FIG. 5C than in FIG. 5B, and smaller in FIG. 5B than in FIG. 5A. In other words, the original 3D image 200 including the 3D object images 510 and 511 is rendered with lower-level lattice cells in FIG. 5D than in FIG. 5C, rendered with lower-level lattice cells in FIG. 5C than in FIG. 5B, and rendered with lower-level lattice cells in FIG. 5B than in FIG. 5A.

FIGS. 5A through 5D illustrate images rendered using the adaptive rendering apparatus of FIG. 1. The 3D object images 510 and 511 are more precisely represented in the rendered image of FIG. 5D than in the rendered image of FIG. 5C, more precisely represented in the rendered image of FIG. 5C than in the rendered image of FIG. 5B, and more precisely represented in the rendered image of FIG. 5B than in the rendered image of FIG. 5A. Therefore, the rendering controller 122 preferably, but not necessarily, provides the transmission controller 114 with rendering conditions that are periodically updated. This type of rendering method in which the generation of a rendered image is controlled by appropriately updating the rendering conditions in consideration of the hardware characteristics of the rendered image generation unit 120 is called an adaptive rendering method. A rendering quality condition which is optimised in consideration of the hardware characteristics of the rendered image generation unit 120 can be expressed using Equations (3) through (5):

$$G(C_k)=P^{a-n}d \quad (3)$$

$$\mathrm{Max}(G(C_1), G(C_2), \ldots, G(C_n))=Q \quad (4)$$

$$V(C_1)+V(C_2)+(OK?)\ldots+V(C_n)<V_{const} \quad (5)$$

where G and Q represent the quality of each of n lattice cell constituting the original 3D image 200 and the quality of a rendered image, respectively, V represents the complexity of cell data of each of the n lattice cells, $C_k$ represents a k-th lattice cell, P is an arbitrary constant larger than 1, q is an integer between 0 and n indicating the level of each of the n lattice cells, d is the distance between the observer 500 and the k-th lattice cell, and $V_{const}$ is a constant. The lattice cell quality G or the rendered image quality Q is determined based on the resolution and complexity of corresponding cell data or the rendered image. If q=0, q indicates a 0-th level, i.e., an uppermost level. If q=n, q indicates an n-th level, i.e., a lowermost level. Accordingly, the lower the level of a lattice cell, the higher the quality G of the lattice cell.

A maximum among the qualities of the n lattice cells is determined as the rendered image quality Q. However, restrictions are imposed on the determining of the rendered image quality Q due to the hardware characteristics of the rendered image generation unit 120. Likewise, a result of summing up the complexity V of each of the cell data should not be larger than the constant $V_{const}$, which is another restriction imposed due to the hardware characteristics of the rendered image generation unit 120. The rendering controller 122 can obtain an optimum rendering quality condition using Equations (3) through (5).

Figure 6A:
FIGS. 6A through 6D and 7A through 7D are diagrams illustrating examples of an adaptively rendered 3D image.
Figure 6B:
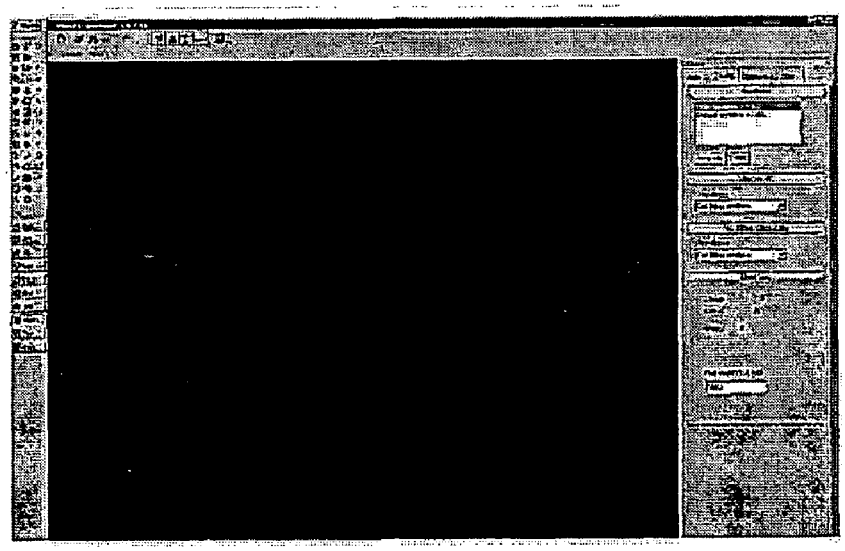
Figure 6C:
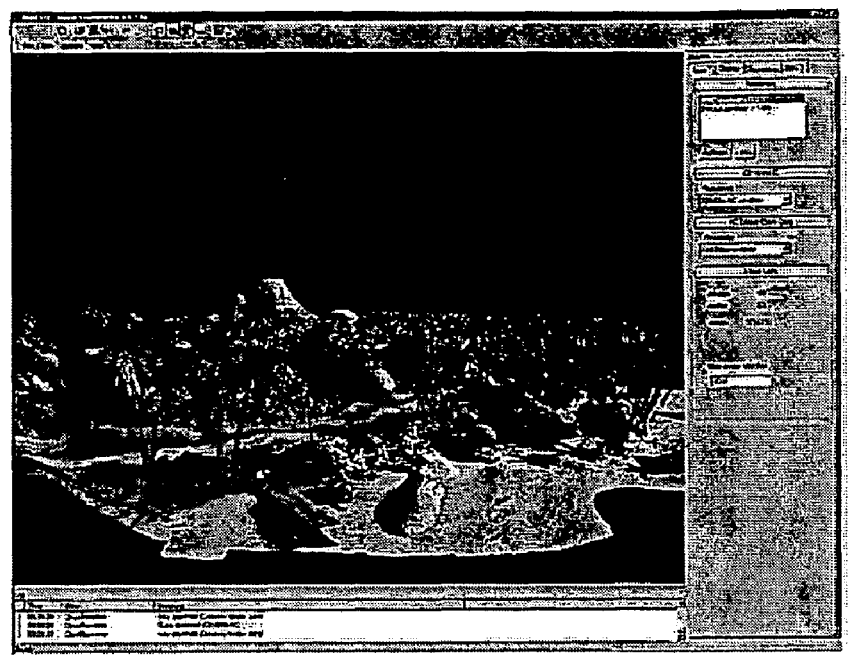
Figure 6D:
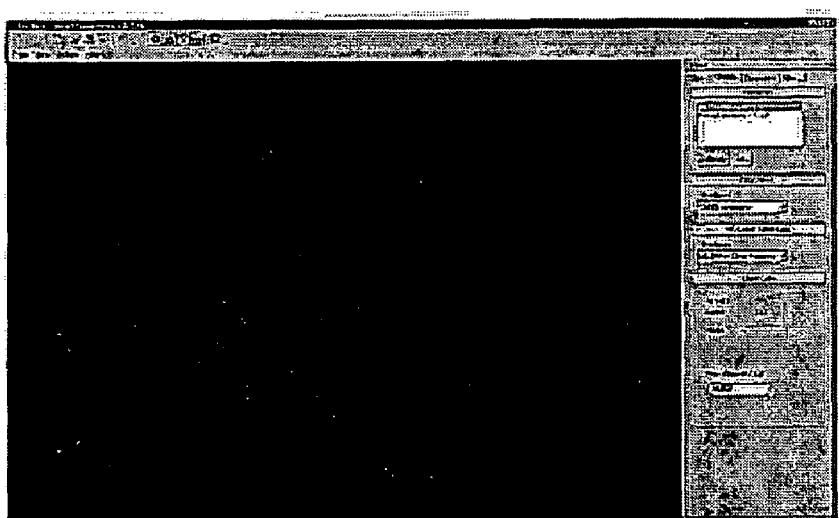

FIGS. 6A through 6D are diagrams illustrating rendered images obtained by appropriately controlling a rendering quality condition. Specifically, FIG. 6A illustrates a low-quality rendered image generated by the rendered image generation unit 120 of FIG. 1, FIG. 6B illustrates a plurality of lattice cells used for generating the rendered image of FIG. 6A, FIG. 6C illustrates a high-quality rendered image generated by the rendered image generation unit 120, and FIG. 6D illustrates a plurality of lattice cells used for generating the rendered image of FIG. 6C. The number of lattice cells illustrated in FIG. 6D is larger than the number of lattice cells illustrated in FIG. 6B. Accordingly, the quality of the rendered image of FIG. 6C is higher than the quality of the rendered image of FIG. 6A.

Figure 7A:
Figure 7B:
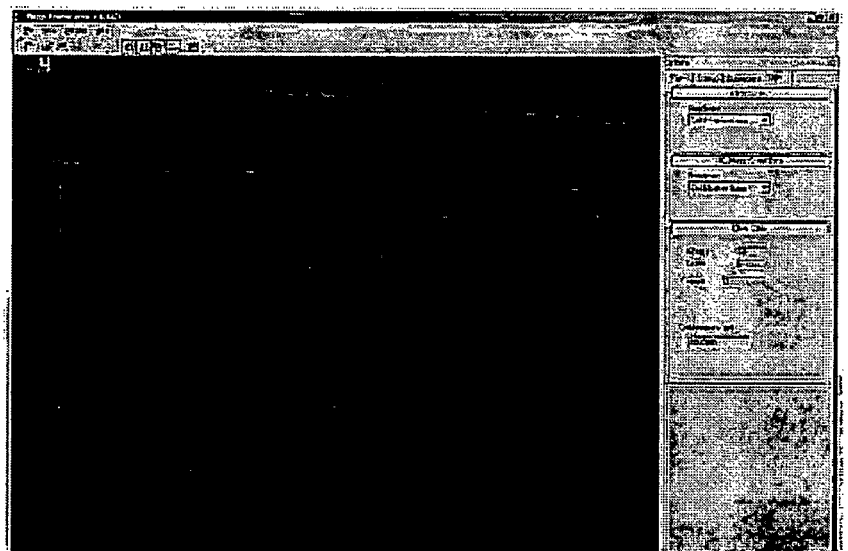
Figure 7C:
Figure 7D:
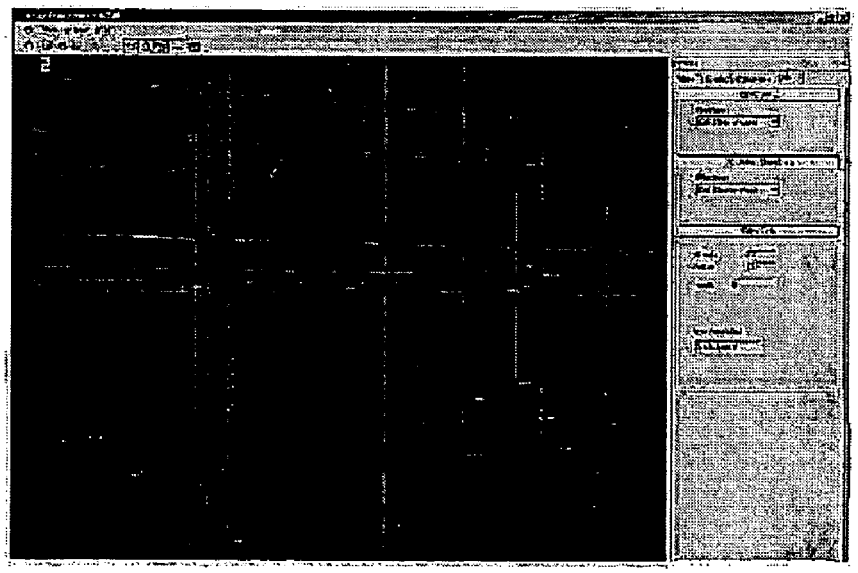

FIGS. 7A through 7D are diagrams illustrating rendered images generated by appropriately controlling a rendering time condition. Specifically, FIG. 7A illustrates a rendered image generated by the rendered image generation unit 120 of FIG. 1 in a case where the rendered image generation unit 120 is required to complete the generation of the rendered image within a short period of time according to the rendering time condition, and FIG. 7B illustrates a plurality of lattice cells used for generating the rendered image of FIG. 7A. In addition, FIG. 7C illustrates a rendered image generated by the rendered image generation unit 120 in a case where the rendered image generation unit 120 is allowed to complete the generation of the rendered image over a long period of time according to the rendering time condition, and FIG. 7D illustrates a plurality of lattice cells used for generating the rendered image of FIG. 7C. The number of lattice cells illustrated in FIG. 7D is larger than the number of lattice cells illustrated in FIG. 7B. Accordingly, the quality of the rendered image of FIG. 7C is higher than the quality of the rendered image of FIG. 7A. In short, as described above, there is a trade-off between a rendering time condition and a rendering quality condition.

Figure 8:
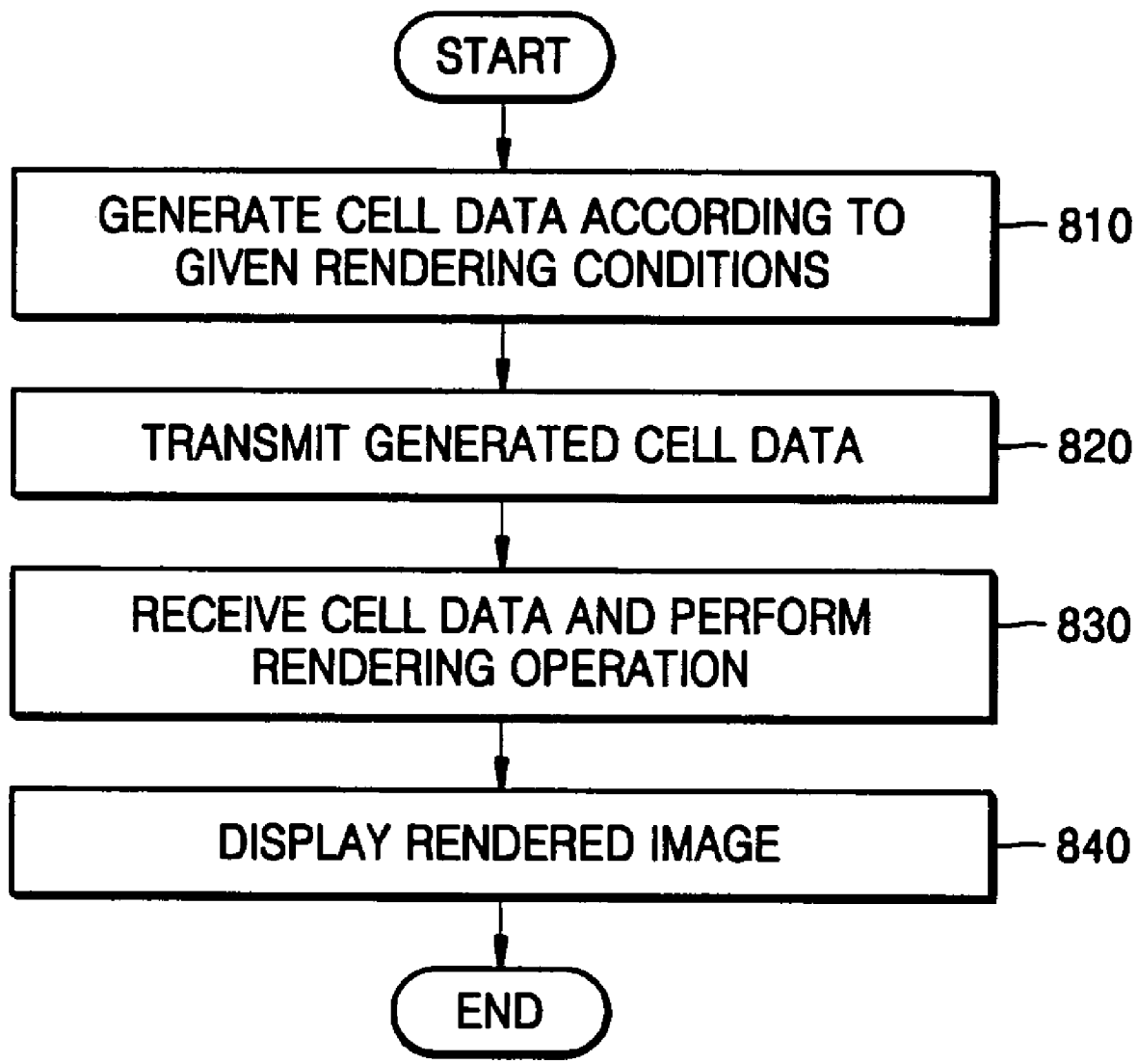
FIG. 8 is a flowchart of an adaptive rendering method using a hierarchical structure in a 3D image, according to an exemplary embodiment of the present invention.

FIG. 8 is a flowchart of an adaptive rendering method using a hierarchical structure in a 3D image, according to an exemplary embodiment of the present invention. In FIG. 8, the adaptive rendering method includes generating cell data in operation 810, transmitting the generated cell data in operation 820, performing a rendering operation on the transmitted cell data in operation 830, and displaying the rendering operation results in operation 840. The adaptive rendering method will now be described in further detail with reference to FIGS. 1 and 8.

In FIGS. 1 and 8, in operation 810, the transmission controller 114 receives rendering conditions from the rendering controller 122, and the cell data generator 116 generates a plurality of cell data according to the rendering conditions. In operation 820, the transmission controller 114 transmits the generated cell data to the rendering controller 122.

In operation 830, the renderer 124 generates a rendered image by arranging the cell data received by the rendering controller 122 according to a hierarchical structure thereamong. In operation 840, the user interface 128 displays the rendered image.

The present invention can be realized as computer-readable codes written on a computer-readable recording medium. The computer-readable recording medium includes nearly all kinds of recording devices on which data can be stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that the computer-readable codes can be stored and executed in a decentralized manner. A functional program, codes, and code segments necessary for realizing the embodiments of the present invention can be easily deduced by one of ordinary skill in the art.

As described above, according to the present invention, it is possible to adjust the quality of a rendered image and the speed of generating the rendered image and to precisely render both a 3D object image and a 3D scenic image.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An adaptive rendering apparatus using a hierarchical structure in a 3D image, the adaptive rendering apparatus comprising:
   a processor that executes:
   a cell data provision unit to divide an original 3D image into a plurality of lattice cells that are connected to one another in a hierarchical structure according to predetermined rendering conditions and outputs a plurality of cell data of an area of the original 3D image corresponding to the lattice cells; and
   a rendered image generation unit to generate a 3D rendered image by arranging the cell data output from the cell data provision unit according to the hierarchical structure, wherein
   a lattice cell belonging to a particular level in the hierarchical structure is divided into a plurality of lattice cells belonging to a level directly below the particular level, and each of the lattice cells in the level directly below the particular level is smaller than the lattice cell of the particular level, and
   a lattice cell corresponding to a predetermined portion of the original 3D image belongs to a lower level in the hierarchical structure than a surrounding lattice cell,
   wherein the cell data of each of the lattice cells has voxel values, wherein the rendering conditions include at least one of the amount of time required for generating the 3D rendered image, and a maximum among the resolutions of the 3D rendered image, wherein the original 3D image is a 3D scenic image containing a 3D object image, and a lattice cell corresponding to the 3D object image belongs to a lower level in the hierarchical structure than a lattice cell surrounding it, wherein the 3D object image is a portion of the original 3D image representing a person or an object, and the 3D scenic image is a portion of the original 3D image representing a place where the person or the object represented by the 3D object image is located, wherein the 3D object image is represented based on the voxel values and the 3D scenic image is represented based on the hierarchical structure.

2. The adaptive rendering apparatus of claim 1, wherein if the rendered image generation unit cannot generate the 3D rendered image by arranging the cell data output from the cell data provision unit according to the hierarchical structure, the cell data provision unit divides the original 3D image into a plurality of lattice cells that are connected to one another in another hierarchical structure according to updated rendering conditions and outputs a plurality of cell data of an area of the original 3D image corresponding to the lattice cells.

3. The adaptive rendering apparatus of claim 2, wherein the updated rendering conditions are determined based on the hardware characteristics of the rendered image generation unit.

4. The adaptive rendering apparatus of claim 1, wherein a lattice cell corresponding to an object in the original 3D image that is nearer to a predetermined viewpoint belongs to a lower level in the hierarchical structure than a lattice cell corresponding to an object in the original 3D image that is farther away from the predetermined viewpoint.

5. The adaptive rendering apparatus of claim 1, wherein the cell data provision unit and the rendered image generation unit are connected to a network, wherein the rendered image generation unit receives the cell data output from the cell data provision unit via the network and arranges the received cell data according to the hierarchical structure.

6. The adaptive rendering apparatus of claim 1, wherein a lattice cell belonging to a particular level in the hierarchical structure is capable of being divided into 8 smaller lattice cells belonging to a level directly below the particular level.

7. The adaptive rendering apparatus of claim 1, wherein the cell data provision unit comprises:
a transmission controller to generate a cell division control signal according to rendering conditions provided by the rendered image generation unit; and
a cell data generator to divide the original 3D image into a plurality of lattice cells that are connected to one another in a hierarchy in response to the cell division control signal and to generate a plurality of cell data that are image data of the original 3D image corresponding to the lattice cells, wherein
the transmission controller outputs the cell data generated by the cell data generator to the rendered image generation unit.

8. The adaptive rendering apparatus of claim 1, wherein the rendered image generation unit comprises:
a rendering controller to receive the cell data output from the cell data provision unit and to generate a cell arrangement control signal; and
a renderer to generate a 3D rendered image by arranging the cell data received by the rendering controller in response to the cell arrangement control signal, wherein the 3D rendered image is generated by arranging the cell data received by the rendering controller according to the hierarchical structure in response to the cell arrangement control signal.

9. The adaptive rendering apparatus of claim 7, wherein the cell data provision unit further comprises an original image generator to photograph a 3D image and to generate an original 3D image representing the photographed 3D image, wherein the cell data generator divides the original 3D image generated by the original image generator into a plurality of lattice cells that are connected to one another in a hierarchy in response to the cell division control signal and generates a plurality of cell data that are image data of the original 3D image generated by the original image generator corresponding to the lattice cells.

10. The adaptive rendering apparatus of claim 8, wherein the rendered image generation unit further comprises a user interface to display the 3D rendered image generated by the renderer.

11. The adaptive rendering apparatus of claim 1, wherein the rendering conditions further include the viewpoint of the 3D rendered image.

12. The adaptive rendering apparatus of claim 1, wherein the lattice cells are formed as 3D lattices and are not duplicative.

13. A cell data generation apparatus using a hierarchical structure in a 3D image, the cell data generation apparatus comprising:
a transmission controller to generate a cell division control signal according to given rendering conditions; and
a cell data generator to divide an original 3D image into a plurality of lattice cells that are connected to one another in a hierarchy in response to the cell division control signal and to generate a plurality of cell data of an area of the original 3D image corresponding to the lattice cells, wherein
the cell data of each of the lattice cells has voxel values, and
a lattice cell corresponding to a predetermined portion of the original 3D image belongs to a lower level in the hierarchical structure than a surrounding lattice cell,
wherein the rendering conditions include at least one of the amount of time required for generating the 3D rendered image, and a maximum among the resolutions of the 3D rendered image,
wherein the original 3D image is a 3D scenic image containing a 3D object image, and a lattice cell corresponding to the 3D object image belongs to a lower level in the hierarchical structure than a lattice cell surrounding it,
wherein the 3D object image is a portion of the original 3D image representing a person or an object, and the 3D scenic image is a portion of the original 3D image representing a place where the person or the object represented by the 3D object image is located,
wherein the 3D object image is represented based on the voxel values and the 3D scenic image is represented based on the hierarchical structure.

14. The cell data generation apparatus of claim 13 further comprising an original image generator to photograph a 3D image and to generate an original 3D image representing the photographed 3D image, wherein
the cell data generator divides the original 3D image generated by the original image generator into a plurality of lattice cells that are connected to one another in a hierarchy in response to the cell division control signal and generates cell data that is image data of the original 3D image generated by the original image generator corresponding to the lattice cells.

15. The cell data generation apparatus of claim 13, wherein the rendering conditions further include at least one of the viewpoint of the 3D rendered image.

16. A rendering apparatus using a hierarchical structure in a 3D image, the rendering apparatus comprising:
　　a rendering controller to generate a cell arrangement control signal according to given rendering conditions; and
　　a renderer to generate a 3D rendered image by arranging a plurality of cell data corresponding to a plurality of lattice cells that are connected to one another in a hierarchical structure in response to the cell arrangement control signal, wherein
　　the 3D rendered image is generated by arranging the cell data according to the hierarchical structure in response to the cell arrangement control signal, and the cell data of each of the lattice cells has voxel values, and
　　a lattice cell corresponding to a predetermined portion of the 3D image belongs to a lower level in the hierarchical structure than a surrounding lattice cell,
　　wherein the rendering conditions include at least one of the amount of time required for generating the 3D rendered image, and a maximum among the resolutions of the 3D rendered image,
　　wherein the 3D image is a 3D scenic image containing a 3D object image, and a lattice cell corresponding to the 3D object image belongs to a lower level in the hierarchical structure than a lattice cell surrounding it,
　　wherein the 3D object image is a portion of the 3D image representing a person or an object, and the 3D scenic image is a portion of the 3D image representing a place where the person or the object represented by the 3D object image is located,
　　wherein the 3D object image is represented based on the voxel values and the 3D scenic image is represented based on the hierarchical structure.

17. The rendering apparatus of claim 16 further comprising a user interface to display the 3D rendered image generated by the renderer.

18. An adaptive rendering method using a hierarchical structure in a 3D image, the adaptive rendering method comprising:
　　dividing an original 3D image into a plurality of lattice cells that are connected to one another in a hierarchical structure according to predetermined rendering conditions and outputting a plurality of cell data of an area of the original 3D image corresponding to the lattice cells, using a computer; and
　　displaying the output cell data on a display, comprising arranging the output cell data according to the hierarchical structure, wherein
　　a lattice cell belonging to a particular level in the hierarchical structure is capable of being divided into a plurality of smaller lattice cells belonging to a level directly below the particular level, and each of the cell data has voxel values, and
　　a lattice cell corresponding to a predetermined portion of the original 3D image belongs to a lower level in the hierarchical structure than a surrounding lattice cell,
　　wherein the rendering conditions include at least one of the amount of time required for generating the 3D rendered image, and a maximum among the resolutions of the 3D rendered image,
　　wherein the original 3D image is a 3D scenic image containing a 3D object image, and a lattice cell corresponding to the 3D object image belongs to a lower level in the hierarchical structure than a lattice cell surrounding it,
　　wherein the 3D object image is a portion of the original 3D image representing a person or an object, and the 3D scenic image is a portion of the original 3D image representing a place where the person or the object represented by the 3D object image is located,
　　wherein the 3D object image is represented based on the voxel values and the 3D scenic image is represented based on the hierarchical structure.

19. The adaptive rendering method of claim 18 further comprising updating the predetermined rendering conditions and returning to the dividing of the original 3D image using the computer.

20. The adaptive rendering method of claim 18, wherein the dividing of the original 3D image comprises:
　　receiving the predetermined rendering conditions and generating a cell division control signal according to the received rendering conditions; and
　　dividing the original 3D image into a plurality of lattice cells that are connected to one another in a hierarchy in response to the cell division control signal and generating a plurality of cell data that are image data of the original 3D image corresponding to the lattice cells.

21. The adaptive rendering method of claim 18, wherein the arranging of the output cell data comprises:
　　receiving the output cell data and generating a cell arrangement control signal; and
　　arranging the received cell data in response to the cell arrangement control signal.

22. The adaptive rendering method of claim 18 further comprising displaying the arrangement result.

23. A cell data generation method using a hierarchical structure in a 3D image, the cell data generation method comprising:
　　generating a cell division control signal according to given rendering conditions; and
　　dividing an original 3D image into a plurality of lattice cells that are connected to one another in a hierarchy in response to the cell division control signal and generating a plurality of cell data of an area of the original 3D image corresponding to the lattice cells; and
　　displaying the cell data on a display, wherein
　　the cell data of each of the lattice cells has voxel values, and
　　a lattice cell corresponding to a predetermined portion of the original 3D image belongs to a lower level in the hierarchical structure than a surrounding lattice cell,
　　wherein the rendering conditions include at least one of the amount of time required for generating the 3D rendered image, and a maximum among the resolutions of the 3D rendered image,
　　wherein the original 3D image is a 3D scenic image containing a 3D object image, and a lattice cell corresponding to the 3D object image belongs to a lower level in the hierarchical structure than a lattice cell surrounding it,
　　wherein the 3D object image is a portion of the original 3D image representing a person or an object, and the 3D scenic image is a portion of the original 3D image representing a place where the person or the object represented by the 3D object image is located,
　　wherein the 3D object image is represented based on the voxel values and the 3D scenic image is represented based on the hierarchical structure.

24. The cell data generation method of claim 23 further comprising photographing a 3D image and generating an original 3D image representing the photographed 3D image, wherein
　　in the dividing of the original 3D image and the generating of the cell data, the generated original 3D image is divided into a plurality of lattice cells that are connected to one another in a hierarchy in response to the cell division control signal, and a plurality of cell data corresponding to the lattice cells are generated, the cell data being image data of an area of the generated original 3D image.

25. A rendering method using a hierarchical structure in a 3D image, the rendering method comprising:

generating a cell arrangement control signal according to given rendering conditions; and generating a 3D rendered image by arranging a plurality of cell data corresponding to a plurality of lattice cells that are connected to one another in a hierarchical structure in response to the cell arrangement control signal; and displaying the 3D rendered image on a display, wherein the cell data of each of the lattice cells has voxel values, and the 3D rendered image is generated by arranging the cell data according to the hierarchical structure in response to the cell arrangement control signal, and a lattice cell corresponding to a predetermined portion of the 3D image belongs to a lower level in the hierarchical structure than a surrounding lattice cell, wherein the rendering conditions include at least one of the amount of time required for generating the 3D rendered image, and a maximum among the resolutions of the 3D rendered image, wherein the 3D image is a 3D scenic image containing a 3D object image, and a lattice cell corresponding to the 3D object image belongs to a lower level in the hierarchical structure than a lattice cell surrounding it, wherein the 3D object image is a portion of the 3D image representing a person or an object, and the 3D scenic image is a portion of the 3D image representing a place where the person or the object represented by the 3D object image is located, wherein the 3D object image is represented based on the voxel values and the 3D scenic image is represented based on the hierarchical structure.

26. The rendering method of claim 25 further comprising displaying the generated 3D rendered image.

27. A non-transitory computer-readable storage medium for storing a computer program for executing an adaptive rendering method using a hierarchical structure in a 3D image, the adaptive rendering method comprising:

dividing an original 3D image into a plurality of lattice cells that are connected to one another in a hierarchical structure according to predetermined rendering conditions and outputting a plurality of cell data of an area of the original 3D image corresponding to the lattice cells; and arranging the output cell data according to the hierarchical structure, wherein a lattice cell belonging to a particular level in the hierarchical structure is capable of being divided into a plurality of smaller lattice cells belonging to a level directly below the particular level, and the cell data of each of the lattice cells has voxel values, and a lattice cell corresponding to a predetermined portion of the original 3D image belongs to a lower level in the hierarchical structure than a surrounding lattice cell, wherein the rendering conditions include at least one of the amount of time required for generating the 3D rendered image, and a maximum among the resolutions of the 3D rendered image, wherein the original 3D image is a 3D scenic image containing a 3D object image, and a lattice cell corresponding to the 3D object image belongs to a lower level in the hierarchical structure than a lattice cell surrounding it, wherein the 3D object image is a portion of the original 3D image representing a person or an object, and the 3D scenic image is a portion of the original 3D image representing a place where the person or the object represented by the 3D object image is located, wherein the 3D object image is represented based on the voxel values and the 3D scenic image is represented based on the hierarchical structure.

28. A non-transitory computer-readable storage medium for storing a computer program for executing a cell data generation method using a hierarchical structure in a 3D image, the cell data generation method comprising:

generating a cell division control signal according to given rendering conditions; and dividing an original 3D image into a plurality of lattice cells that are connected to one another in a hierarchy in response to the cell division control signal and generating a plurality of cell data of an area of the original 3D image corresponding to the lattice cells, wherein the cell data of each of the lattice cells has voxel values, and a lattice cell corresponding to a predetermined portion of the original 3D image belongs to a lower level in the hierarchical structure than a surrounding lattice cell, wherein the rendering conditions include at least one of the amount of time required for generating the 3D rendered image, and a maximum among the resolutions of the 3D rendered image, wherein the original 3D image is a 3D scenic image containing a 3D object image, and a lattice cell corresponding to the 3D object image belongs to a lower level in the hierarchical structure than a lattice cell surrounding it, wherein the 3D object image is a portion of the original 3D image representing a person or an object, and the 3D scenic image is a portion of the original 3D image representing a place where the person or the object represented by the 3D object image is located, wherein the 3D object image is represented based on the voxel values and the 3D scenic image is represented based on the hierarchical structure.

29. A non-transitory computer-readable storage medium for storing a computer program for executing a rendering method using a hierarchical structure in a 3D image, the rendering method comprising:

generating a cell arrangement control signal according to given rendering conditions; and generating a 3D rendered image by arranging a plurality of cell data corresponding to a plurality of lattice cells that are connected to one another in a hierarchical structure in response to the cell arrangement control signal, wherein the cell data of each of the lattice cells has voxel values, and the 3D rendered image is generated by arranging the cell data according to the hierarchical structure in response to the cell arrangement control signal, and a lattice cell corresponding to a predetermined portion of the 3D image belongs to a lower level in the hierarchical structure than a surrounding lattice cell, wherein the rendering conditions include at least one of the amount of time required for generating the 3D rendered image, and a maximum among the resolutions of the 3D rendered image, wherein the 3D image is a 3D scenic image containing a 3D object image, and a lattice cell corresponding to the 3D object image belongs to a lower level in the hierarchical structure than a lattice cell surrounding it, wherein the 3D object image is a portion of the original 3D image representing a person or an object, and the 3D scenic image is a portion of the original 3D image representing a place where the person or the object represented by the 3D object image is located, wherein the 3D object image is represented based on the voxel values and the 3D scenic image is represented based on the hierarchical structure.

30. The adaptive rendering apparatus of claim 1, wherein the predetermined rendering conditions are different for a plurality of predetermined portions of the original 3D image such that a plurality of lattice cells in each predetermined portion is rendered in accordance with the rendering conditions for the respective predetermined portion.

* * * * *

UNITED STATES PATENT AND TRADEMARK OFFICE
CERTIFICATE OF CORRECTION

| | | |
|---|---|---|
| PATENT NO. | : 7,796,127 B2 | |
| APPLICATION NO. | : 11/288368 | |
| DATED | : September 14, 2010 | |
| INVENTOR(S) | : Shinjun Lee et al. | |

It is certified that error appears in the above-identified patent and that said Letters Patent is hereby corrected as shown below:

Title page, item [75] (Inventors), line 1, Delete "Seokypon" and insert -- Seokyoon --, therefor.

Signed and Sealed this
Fourth Day of January, 2011

David J. Kappos
*Director of the United States Patent and Trademark Office*